United States Patent
Eguchi et al.

(10) Patent No.: US 12,095,327 B2
(45) Date of Patent: Sep. 17, 2024

(54) SLOT LINER AND ROTATING ELECTRIC MACHINE

(71) Applicant: NIKKISO CO., LTD., Tokyo (JP)

(72) Inventors: Masaaki Eguchi, Saitama (JP); Akira Ogura, Tokyo (JP)

(73) Assignee: NIKKISO CO., LTD., Tokyo (JP)

( * ) Notice: Subject to any disclaimer, the term of this patent is extended or adjusted under 35 U.S.C. 154(b) by 0 days.

(21) Appl. No.: 18/693,696

(22) PCT Filed: Jun. 13, 2022

(86) PCT No.: PCT/JP2022/023640
§ 371 (c)(1),
(2) Date: Mar. 20, 2024

(87) PCT Pub. No.: WO2023/095367
PCT Pub. Date: Jun. 1, 2023

(65) Prior Publication Data
US 2024/0266898 A1 Aug. 8, 2024

(30) Foreign Application Priority Data
Nov. 25, 2021 (JP) .................................. 2021-191271

(51) Int. Cl.
*H02K 3/34* (2006.01)
(52) U.S. Cl.
CPC ............... *H02K 3/345* (2013.01); *H02K 3/34* (2013.01)
(58) Field of Classification Search
CPC ............ H02K 3/345; H02K 3/34; H02K 3/30
USPC ................................................ 310/214, 215
See application file for complete search history.

(56) References Cited

U.S. PATENT DOCUMENTS

| 5,721,397 A * | 2/1998 | Weinberg | H01B 3/422 174/110 V |
| 5,982,056 A * | 11/1999 | Koyama | C08L 63/00 310/43 |
| 2005/0101695 A1* | 5/2005 | Wada | H02K 3/345 174/120 SR |
| 2015/0035406 A1 | 2/2015 | Huang et al. | |

FOREIGN PATENT DOCUMENTS

JP 2015-33323 A 2/2015

OTHER PUBLICATIONS

PCT/JP2022/023640, International Search Report, Aug. 16, 2022.
PCT/JP2022/023640, Written Opinion, Aug. 16, 2022.

* cited by examiner

*Primary Examiner* — Alexander A Singh
(74) *Attorney, Agent, or Firm* — WC&F IP

(57) ABSTRACT

The slot liner (13) includes a laminated insulation sheet (131) having a length (L1) longer than a length (L2) of a stator core in an axial direction and a pair of reinforcing sheets (135, 136). The laminated insulation sheet includes an outer insulation sheet (134) in contact with an inner surface (112d) of the slot and an inner insulation sheet (132) in contact with a conductor. Each of reinforcing sheets is folded back in the axial direction in such a way as to cover an end surface (134a, 134b) of the outer insulation sheet and includes a folded portion (135e, 136e) that covers the end surface of the outer insulation sheet, a first end portion (135f1, 136f1) disposed between the inner surface of the slot and the outer insulation sheet, and a second end portion (135g, 136g) disposed between the outer and inner insulation sheets.

7 Claims, 8 Drawing Sheets

SLOT LINER AND ROTATING ELECTRIC MACHINE

TECHNICAL FIELD

The present invention relates to a slot liner and a rotating electric machine.

BACKGROUND ART

A rotating electric machine such as an electric motor and a generator includes a hollow cylindrical-shaped stator core, a conductor (a coil), and a slot liner. A plurality of spaces (hereinafter referred to as "slot") through which the conductors are passed are disposed at equal intervals on an inner peripheral surface of the stator core. The slot liner is disposed in the slot and provides insulation between the stator core and the conductors. Both end portions of the slot liner project from an open end of the slot in order to prevent contact between the conductors and the open end of the slot. A portion of the conductor not projecting from the open end is incorporated inside the slot by bundling the conductors into a ring-shaped bundle, for example. A portion of the conductor projecting from the open end is formed together with a bundle of other conductors. Thus, both end portions of the slot liner may be subjected to loads such as bending stress when the conductors are formed, and the both end portions of the slot liner may be damaged.

Techniques for preventing damage of both end portions of the slot liner have been proposed (for example, see PTL 1).

In the technique disclosed in PTL 1, reinforcing sheets made of polymeric materials such as epoxy or aramid are bonded to both end portions of the slot liner, thereby reinforcing both end portions of the slot liner. However, the insulation property of the slot liner depends on the structure of the slot liner and may be insufficient. Thus, the structure of the slot liner is susceptible to improvement.

CITATION LIST

Patent Literature

[PTL 1] JP2015-33323 A

SUMMARY OF INVENTION

Technical Problem

The present invention is directed to provide a reinforced slot liner and a rotating electric machine without causing degradation of insulation.

Solution to Problem

A slot liner according to one aspect of the present invention is a slot liner disposed in a slot of a stator core included in a rotating electric machine and configured to provide insulation between a conductor passed through inside the slot and the stator core, and the slot liner includes a laminated insulation sheet including a plurality of insulation sheets being laminated and having a length longer than a length of the stator core in an axial direction of a rotating shaft included in the rotating electric machine and a pair of reinforcing sheets that reinforce the laminated insulation sheet, in which the laminated insulation sheet includes an outer insulation sheet in contact with an inner surface of the slot and an inner insulation sheet in contact with the conductor, and each of the pair of reinforcing sheets is folded back in the axial direction in such a way as to cover an end surface of the outer insulation sheet and includes a folded portion that covers the end surface of the outer insulation sheet, a first end portion disposed between the inner surface of the slot and the outer insulation sheet, and a second end portion disposed between the outer insulation sheet and the inner insulation sheet.

A rotating electric machine according to one aspect of the present invention includes the slot liner according to one aspect of the present invention.

Advantageous Effects of Invention

The present invention is able to provide a reinforced slot liner and a rotating electric machine without causing degradation of insulation.

BRIEF DESCRIPTION OF DRAWINGS

FIG. 4 is a schematic perspective view of a slot liner illustrating an embodiment of the slot liner according to the present invention.

DESCRIPTION OF EMBODIMENTS

Figure 1:
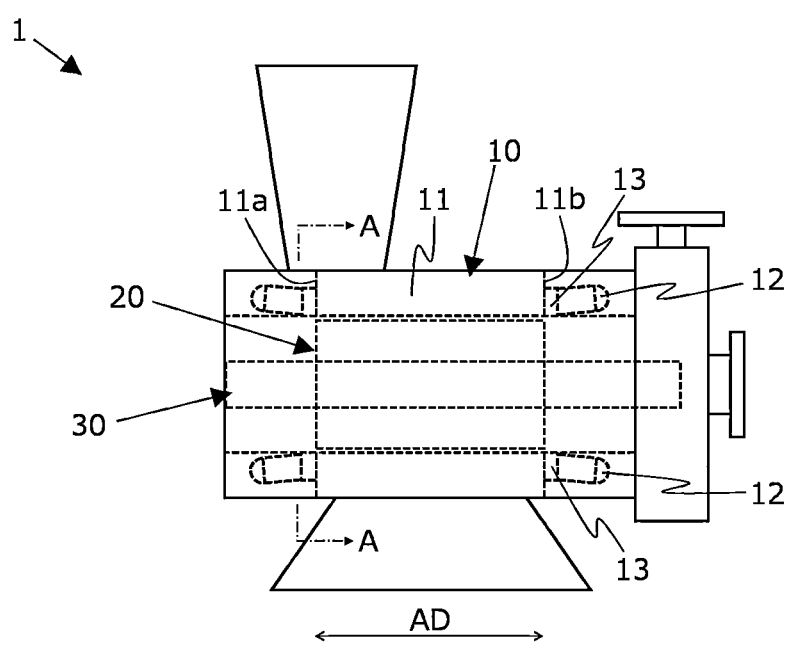
FIG. 1 is a schematic diagram illustrating an embodiment of a rotating electric machine according to the present invention.

Embodiments of a slot liner and a rotating electric machine according to the present invention will be described below with reference to the drawings. In the drawings, the same members and components are indicated with the same reference signs, and repetitive description thereof will be omitted.

Rotating Electric Machine

First, an embodiment of the rotating electric machine according to the present invention will be described.

The rotating electric machine according to the present invention is a canned motor pump that transports a high-temperature liquid (such as oil), for example.

Configuration of Rotating Electric Machine

FIG. 1 is a schematic diagram illustrating an embodiment of the rotating electric machine according to the present invention. The figure illustrates a part of the internal structure of the rotating electric machine 1 with dashed lines for convenience of description.

The rotating electric machine 1 includes a stator 10, a rotor 20, and a rotating shaft 30.

Figure 2:
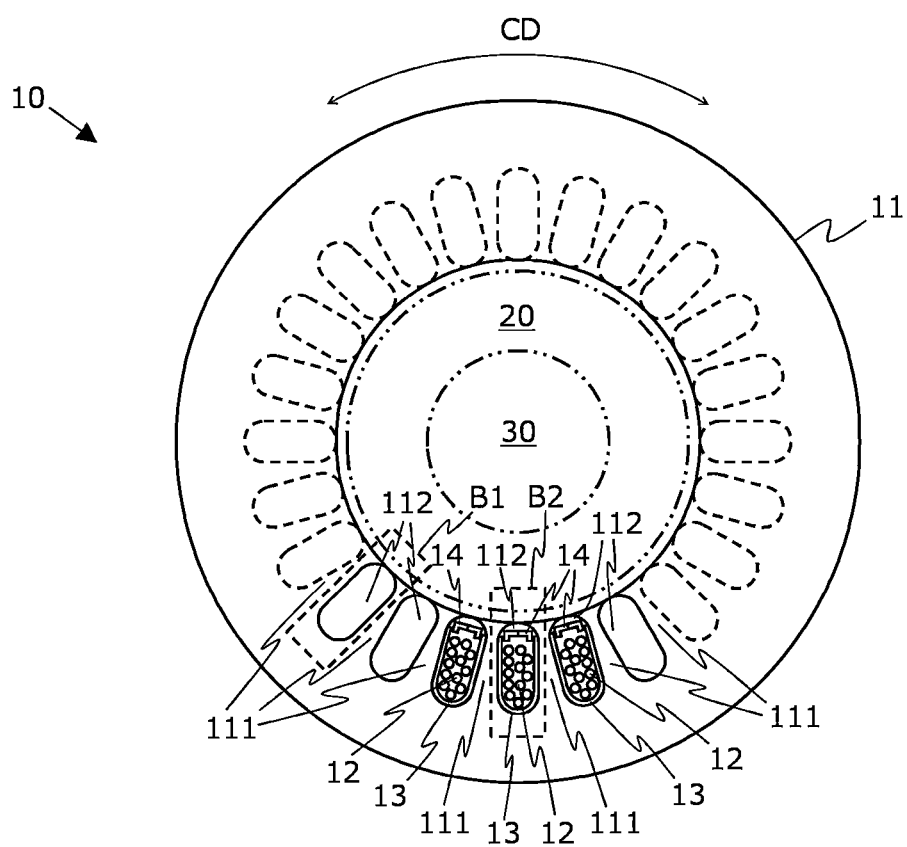
FIG. 2 is a schematic cross-sectional view of a stator part included in the rotating electric machine in FIG. 1 taken along the line A-A in FIG. 1.

FIG. 2 is a schematic cross-sectional view of the stator 10 taken along the line A-A in FIG. 1. The figure illustrates the rotor 20 and the rotating shaft 30 with two dot chain lines. The figure does not illustrate a part of the stator 10 for convenience of description.

The stator 10 generates a rotating magnetic field that rotates the rotor 20. The stator 10 includes a stator core 11, a plurality of conductors 12, a plurality of slot liners 13, and a plurality of wedges 14.

The stator core 11 holds the conductor 12. The stator core 11 has a hollow cylindrical shape. The stator core 11 includes a plurality of teeth 111 and a plurality of slots 112.

In the following description, a "circumferential direction" means the circumferential direction of the stator core 11 (the direction indicated by the arrow CD in FIG. 2). An "axial direction" means the direction along the axis of rotation of the rotor 20 (the rotating shaft 30) (the direction indicated by the arrow AD in FIG. 1).

The teeth 111 define the slot 112. The teeth 111 are disposed at equal intervals on an inner peripheral surface of the stator core 11 in the circumferential direction.

Figures 3A, 3B:
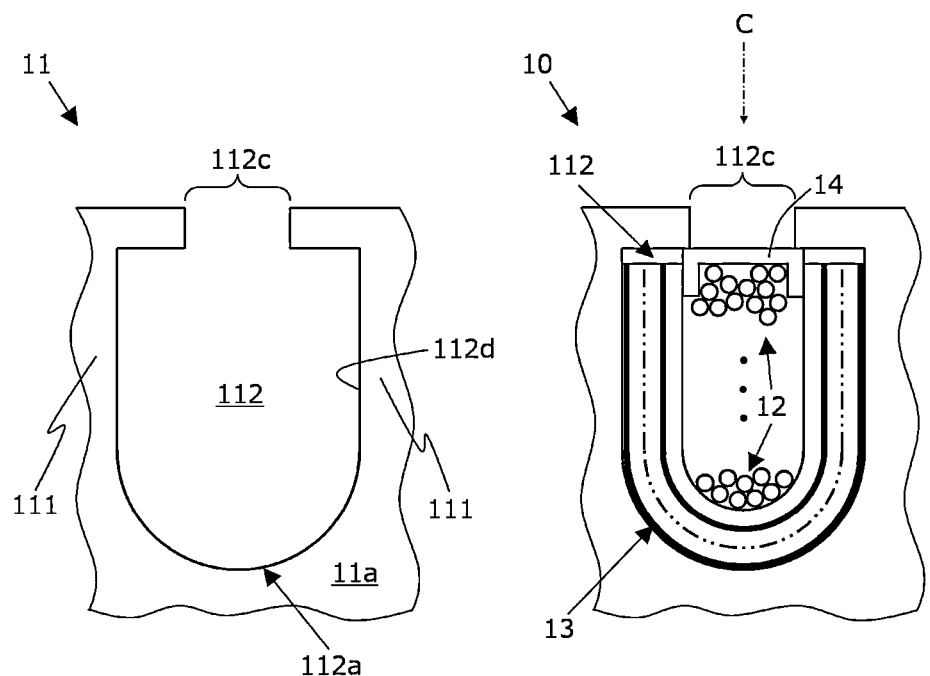
FIG. 3A is an enlarged schematic cross-sectional view of B1 part of a stator core in FIG. 2 included in the rotating electric machine in FIG. 1.
FIG. 3B is an enlarged schematic cross-sectional view of B2 part of the stator in FIG. 2 included in the rotating electric machine in FIG. 1.

FIG. 3A is an enlarged schematic cross-sectional view of B1 part of the stator core 11 in FIG. 2, and FIG. 3B is an enlarged schematic cross-sectional view of B2 part of the stator 10 in FIG. 2. The figure B illustrates the size (the thickness) of each member intentionally emphasizing more than the actual dimensions thereof in order to clarify the positional relationship of each member included in the slot liner 13. The FIG. 3B does not illustrate a part of the conductor 12 for convenience of description.

A tip portion of the tooth 111 (an end portion on the inner side of the tooth 111 in the radial direction of the stator core 11) projects toward both sides in the circumferential direction. That is, when viewed in the axial direction, the tooth 111 has a substantially T shape.

Referring now back to FIGS. 2 and 3, the slot 112 is a space defined between two adjacent teeth 111 and 111 in the circumferential direction. The slots 112 are disposed at equal intervals on the inner peripheral surface of the stator core 11 in the circumferential direction. The slot 112 is defined over the entire length of the stator core 11 in the axial direction. As a result, on both end surfaces 11a and 11b (see FIGS. 1, 4 and 5, the same applies below.) of the stator core 11, open ends 112a and 112b (see FIG. 4, the same applies below.) each having the same shape as the section of the slot 112 (the cross section in a direction orthogonal to the axial direction) are formed. A slit-shaped opening 112c is defined between tips of two teeth 111 and 111 defining the slot 112.

The conductor 12 is passed through the corresponding slot 112 and constitutes a coil that generates the rotating magnetic field in the stator 10. The conductor 12 includes, for example, three-phase windings of a U phase, a V phase, and a W phase. Both end portions (hereinafter referred to as "coil end") that are portions of the conductor 12 are disposed projecting from the open ends 112a and 112b of the slot 112 in the axial direction. In contrast, a portion of other part of the conductor 12 (a portion other than the coil end) is disposed in the corresponding slot 112 by bundling the conductor 12 into a ring-shaped bundle. The coil end of the conductor 12 is bent in the circumferential direction and is formed together with a bundle of other conductors, for example.

The slot liner 13 is an insulation material that provides insulation between the stator core 11 and the conductor 12. The slot liner 13 is disposed in the corresponding slot 112. A specific configuration of the slot liner 13 will be described later.

The wedge 14 prevents the conductor 12 and the slot liner 13 from falling out of the corresponding slot 112. The wedge 14 is disposed in the corresponding slot 112 and covers the opening 112c of the slot 112 from the inside.

The rotor 20 rotates due to the rotating magnetic field generated in stator 10. The rotor 20 has a hollow cylindrical shape. The rotor 20 is accommodated in the stator core 11.

The rotating shaft 30 rotates due to the rotation of the rotor 20 and transmits rotating power to an impeller (not illustrated) of the rotating electric machine 1. The rotating shaft 30 has a solid cylindrical shape. The rotating shaft 30 is disposed through the rotor 20 and is fixed.

Configuration of Slot Liner

Next, the configuration of the slot liner 13 will be described.

Figure 4A:
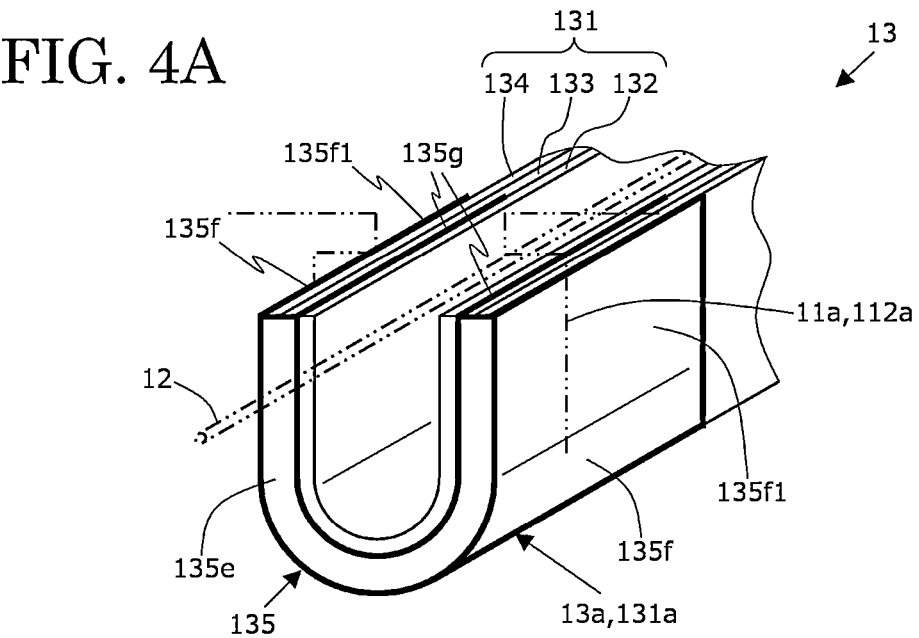
FIG. 4A illustrates one end side of the slot liner and FIG. 4B illustrates another end side of the slot liner.
Figure 4B:
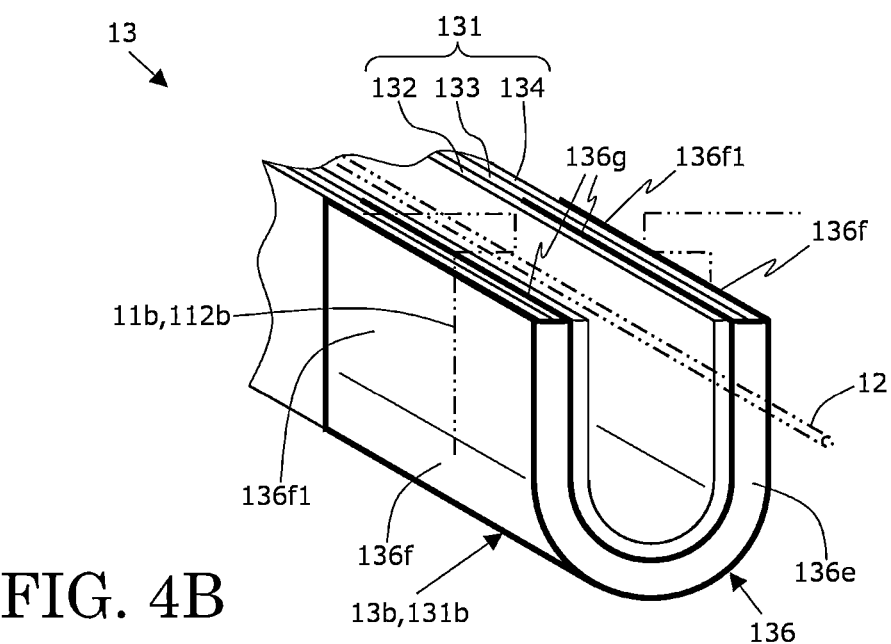
Figure 5:
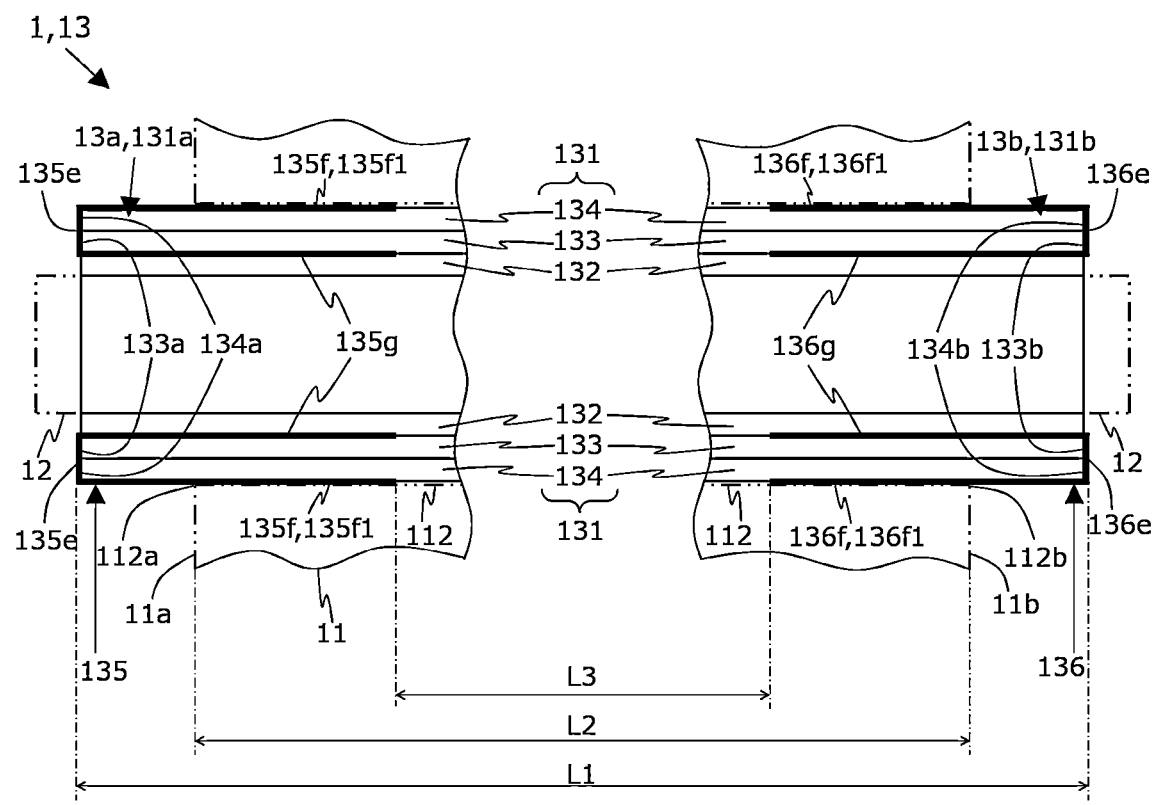
FIG. 5 is a schematic view of the slot liner in FIG. 4, viewed from the direction illustrated with the arrow C in FIG. 3.

FIG. 4 is a schematic perspective view of the slot liner (the slot liner 13) illustrating the embodiment of the slot liner according to the present invention, and FIG. 4A illustrates an end portion 13a side of the slot liner 13 and FIG. 4B illustrates another end portion 13b side of the slot liner 13. FIG. 5 is a schematic view of the slot liner 13, viewed from the direction illustrated with the arrow C in FIG. 3. FIGS. 4 and 5 illustrate the size (the thickness) of each member intentionally emphasizing more than the actual dimensions thereof in order to clarify the positional relationship of each member included in the slot liner 13. FIGS. 4 and 5 each illustrate a part of the stator core 11 and the conductor 12 with two dot chain lines for convenience of description.

The slot liner 13 includes a laminated insulation sheet 131 and a pair of reinforcing sheets 135 and 136.

The laminated insulation sheet 131 includes a plurality of, e.g., three in the present embodiment, insulation sheets 132, 133, and 134. The insulation sheet 132 is an example of an inner insulation sheet in the present invention, the insulation sheet 133 is an example of an intermediate insulation sheet in the present invention, and the insulation sheet 134 is an example of an outer insulation sheet in the present invention. That is, the laminated insulation sheet 131 includes the inner insulation sheet, the intermediate insulation sheet, and the outer insulation sheet in the present invention. The insulation sheets 132 to 134 each have a rectangular sheet shape with short sides and long sides. In the drawings, the thicknesses of the insulation sheets 132 to 134 are emphasized, and thus each of the shapes (the sizes) of the insulation sheets 132 to 134 is illustrated to be different, but the shapes of the insulation sheets 132 to 134 are the same in the present embodiment.

Figure 6A:
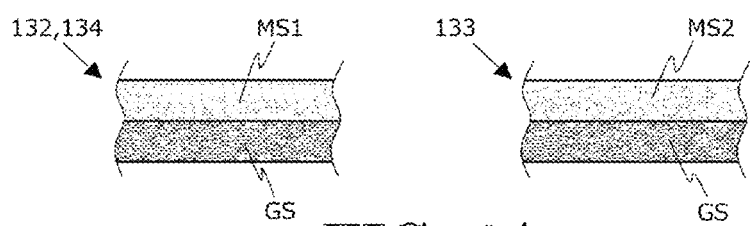
FIG. 6A is an enlarged schematic cross-sectional view of the insulation sheet illustrating an example of the insulation sheet included in the slot liner in FIG. 4.
Figure 6B:
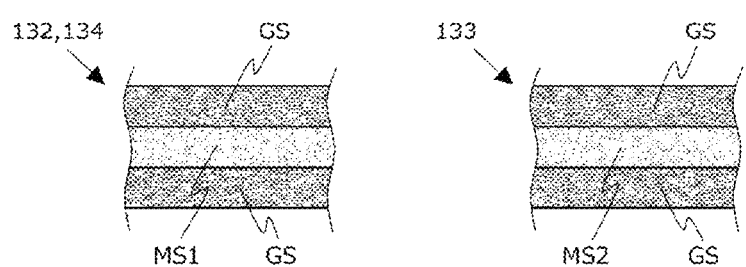
FIG. 6B is an enlarged schematic cross-sectional view of the insulation sheet illustrating another example of the insulation sheet.

FIG. 6A is an enlarged schematic cross-sectional view of the insulation sheets illustrating an example of the insulation sheets 132 to 134, and FIG. 6B is an enlarged schematic cross-sectional view of the insulation sheets illustrating another example of the insulation sheets 132 to 134.

Each of the insulation sheets 132 and 134 is a reconstituted mica insulation sheet including a reconstituted mica base sheet MS1 and a glass cloth sheet GS. The reconstituted mica base sheet MS1 is a sheet in which flake-shaped mica is connected and solidified with resin. That is, the reconstituted mica base sheet MS1 includes the reconstituted mica. The glass cloth sheet GS is a sheet woven with glass fibers. As illustrated in FIG. 6A, the insulation sheets 132 and 134 each include the glass cloth sheet GS stuck on one surface of the reconstituted mica base sheet MS1.

The insulation sheet 133 is a mica splittings insulation sheet including a mica splittings base sheet MS2 and the glass cloth sheet GS. The mica splittings base sheet MS2 is a sheet having mica splittings as a base material. That is, the mica splittings base sheet MS2 includes the mica splittings. As illustrated in FIG. 6A, the insulation sheet 133 includes another glass cloth sheet GS stuck on one surface of the mica splittings base sheet MS2.

Herein, the reconstituted mica insulation sheet has higher flexibility than the mica splittings insulation sheet. In contrast, the mica splittings insulation sheet has a higher insulation property than the reconstituted mica insulation sheet and is more expensive than the reconstituted mica insulation sheet.

Note that, as illustrated in FIG. 6B, each insulation sheet in the present invention may include glass cloth sheets stuck on both surfaces of the reconstituted mica base sheet or the mica splittings base sheet.

Referring now back to FIGS. 4 and 5, the laminated insulation sheet 131 includes three insulation sheets 132 to 134 being laminated. Specifically, when viewed in the axial direction, the insulation sheets 132 to 134 are laminated in the order of the insulation sheet 132, the insulation sheet 133, and the insulation sheet 134 from the inner side (the conductor 12 side) to the outer side (an inner surface 112d side of the slot 112). That is, the insulation sheet 132 is superposed on one surface of the insulation sheet 133, and the insulation sheet 134 is superposed on the other surface of the insulation sheet 133. That is, the mica splittings insulation sheet is sandwiched between the two reconstituted mica insulation sheets. As a result, when the laminated insulation sheet 131 is bent, the insulation sheets 132 and 134 support the insulation sheet 133, thereby preventing the concentration of the stress and preventing breakage of the insulation sheet 133 (the mica splittings).

Figure 7A:
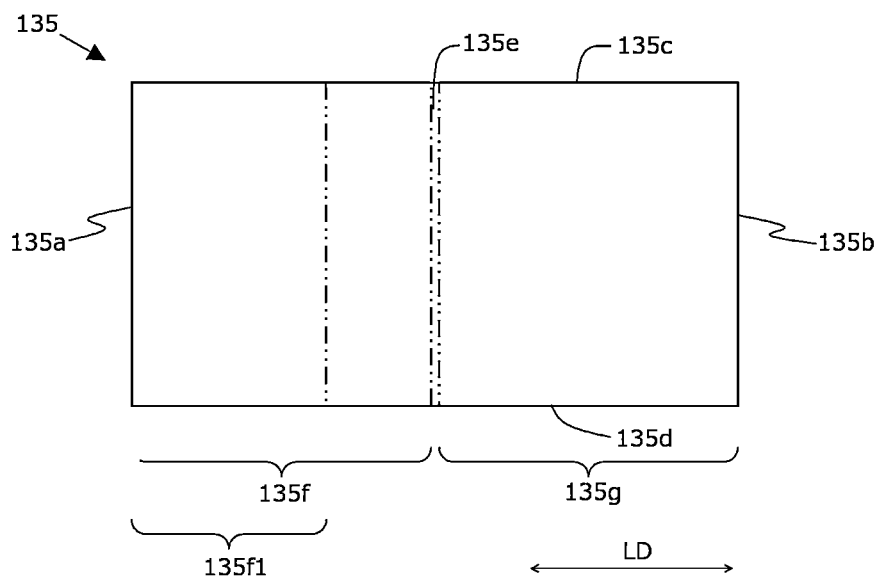
FIG. 7A and FIG. 7B are schematic plan views of the reinforcing sheet included in the slot liner in FIG. 4.
Figure 7B:
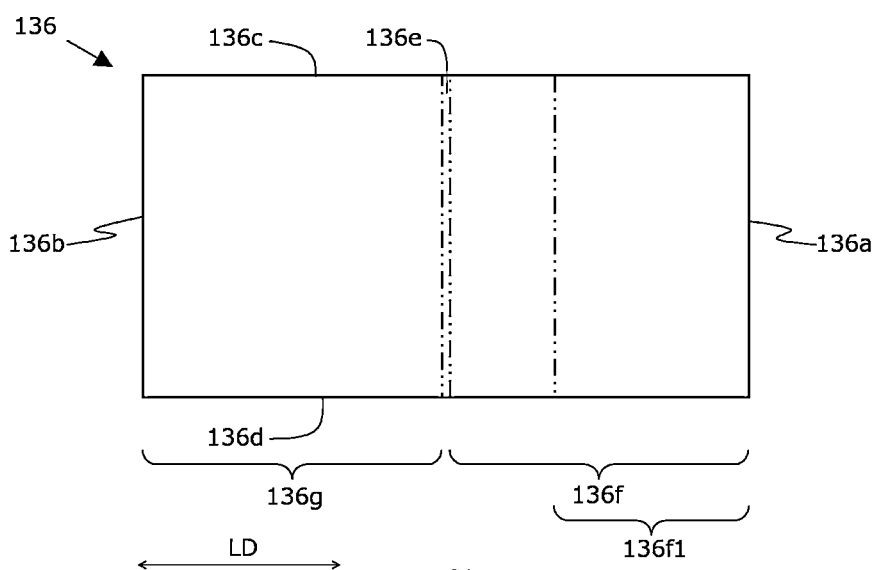

FIG. 7A is a schematic plan view of the reinforcing sheet 135 and FIG. 7B is a schematic plan view of the reinforcing sheet 136. In the following description, the left-right direction of the page in FIG. 7 (the direction indicated by the arrow LD in FIG. 7) is defined as a "long-side direction" for convenience of description.

The reinforcing sheet 135 and 136 reinforce both end portions 131a and 131b of the laminated insulation sheet 131 (see FIGS. 4 and 5). The reinforcing sheets 135 and 136 are an insulation sheet made of a polymer material such as polyimide, for example. The reinforcing sheet 135 and 136 each have a rectangular sheet shape.

The reinforcing sheet 135 includes four end sides 135a, 135b, 135c, and 135d, a folded portion 135e, a first half portion 135f, and a second half portion 135g.

The end sides 135a and 135b are sides orthogonal to the long-side direction, and the end sides 135c and 135d are sides parallel to the long-side direction. In the long-side direction, the folded portion 135e is a band-shaped (or linear) portion located at the center of the reinforcing sheet 135. The first half portion 135f is a portion from the folded portion 135e to the end side 135a of the reinforcing sheet 135. The second half portion 135g is a portion from the folded portion 135e to the end side 135b of the reinforcing sheet 135.

The reinforcing sheet 136 includes four end sides 136a, 136b, 136c, and 136d, a folded portion 136e, a first half portion 136f, and a second half portion 136g.

The end sides 136a and 136b are sides orthogonal to the long-side direction, and the end sides 136c and 136d are sides parallel to the long-side direction. In the long-side direction, the folded portion 136e is a band-shaped (or linear) portion located at the center of the reinforcing sheet 136. The first half portion 136f is a portion from the folded portion 136e to the end side 136a of the reinforcing sheet 136. The second half portion 136g is a portion from the folded portion 136e to the end side 136b of the reinforcing sheet 136.

Referring now back to FIGS. 3 to 5, in the axial direction, the reinforcing sheet 135 is attached to the end portion 131a of the laminated insulation sheet 131 with one end portions of the insulation sheets 133 and 134 being sandwiched in the reinforcing sheet 135. Specifically, the reinforcing sheet 135 is folded back in a valley fold (or mountain fold) at the folded portion 135e in such a way that the first half portion 135f coincides with the second half portion 135g. In this case, in the axial direction, the folded portion 135e covers the end surfaces 133a and 134a on one end side of the insulation sheets 133 and 134. The first half portion 135f is disposed on the outer side of the insulation sheet 134 (on the inner surface 112d side of the slot 112). The second half portion 135g is disposed between the insulation sheet 132 and the insulation sheet 133. The second half portion 135g is an example of the second end portion in the present invention.

In the axial direction, the reinforcing sheet 136 is attached to the end portion 131b of the laminated insulation sheet 131 with another end portions of the insulation sheets 133 and 134 being sandwiched in the reinforcing sheet 136. Specifically, the reinforcing sheet 136 is folded back in a valley fold (or mountain fold) at the folded portion 136e in such a way that the first half portion 136f coincides with the second half portion 136g. In this case, in the axial direction, the folded portion 136e covers the end surfaces 133b and 134b on another end side of the insulation sheets 133 and 134. The first half portion 136f is disposed on the outer side of the insulation sheet 134 (on the inner surface 112d side of the slot 112). The second half portion 136g is disposed between the insulation sheet 132 and the insulation sheet 133. The second half portion 136g is an example of the second end portion in the present invention.

The slot liner 13 is disposed between the conductor 12 and the stator core 11 (the inner surface 112d of the slot 112) in the corresponding slot 112. When viewed in the axial direction, the slot liner 13 is bent in a U shape along the inner surface 112d of the slot 112 in such a way that the insulation sheet 132 is inward. The insulation sheet 132 comes into contact with the conductor 12, and the insulation sheet 134 comes into contact with the inner surface 112d of the slot 112.

In the axial direction, the length L1 of the laminated insulation sheet 131 (i.e., the length of the slot liner 13) is longer than the length L2 of the stator core 11. Thus, in the axial direction, both end portions 131a and 131b of the laminated insulation sheet 131 project from the open ends 112a and 112b of the slot 112.

Herein, in the axial direction, the open end 112a of the slot 112 is located closer to the folded portion 135e than the center of the first half portion 135f of the reinforcing sheet 135. Similarly, the open end 112b of the slot 112 is located closer to the folded portion 136e than the center of the first half portion 136f of the reinforcing sheet 136. As a result, in the axial direction, the length L3 between the reinforcing sheets 135 and 136 (the end sides 135a and 136a) is shorter than the length L2 of the stator core 11. In the axial direction, a portion 135f1 closer to the end side 135a than the open end 112a in the first half portion 135f of the reinforcing sheet 135

(about half portion of the first half portion 135f in the present embodiment, hereinafter referred to as "first end portion") is disposed between the inner surface 112d of the slot 112 and the insulation sheet 134. Similarly, in the axial direction, a portion 136f1 closer to the end side 136a than the open end 112b in the first half portion 136f of the reinforcing sheet 136 (about half portion of the first half portion 136f in the present embodiment, hereinafter referred to as "first end portion") is disposed between the inner surface 112d of the slot 112 and the insulation sheet 134.

As described above, the coil end is bent in the circumferential direction at the time of forming. Thus, when the coil end is formed, the end portions 13a and 13b of the slot liner 13 receive the load (the bending stress) directed in the circumferential direction from the conductor 12. This load increases, in particular, at the open ends 112a and 112b of the slot 112. The reinforcing sheets 135 and 136 disperses this stress. As a result, damage of the laminated insulation sheet 131, which is a mechanically fragile mica insulation sheet, is prevented.

As described above, the second half portions 135g and 136g of the reinforcing sheet 135 and 136 are disposed between the insulation sheet 132 and the insulation sheet 133. That is, the reinforcing sheet 135 and 136 are not disposed on the inner side of the insulation sheet 132 (on the conductor 12 side). Thus, the conductor 12 is not in contact with the reinforcing sheets 135 and 136 in the slot liner 13. As a result, even though the rotating electric machine 1 is used under a high temperature environment with equal to or higher than an upper limit value (e.g., 400° C.) of the heat-resistant temperature of the reinforcing sheets 135 and 136 and the reinforcing sheets 135 and 136 deteriorate, the degradation of insulation between the stator core 11 and the conductor 12 via the deteriorated reinforcing sheets 135 and 136 does not occur.

If the reinforcing sheets 135 and 136 are disposed on the inner side of the insulation sheet 132, the conductor 12 interferes with the reinforcing sheets 135 and 136 when the conductor 12 is passed through the slot liner 13. As a result, the reinforcing sheets 135 and 136 become an obstacle, and technical issues such as damage of the reinforcing sheets 135 and 136 and deterioration in the work efficiency to pass through the conductor 12 may occur. However, as described above, in the slot liner 13, the reinforcing sheets 135 and 136 are not disposed on the inner side of the insulation sheet 132. Thus, the technical issue described above does not occur when the conductor 12 is passed through.

In the laminated insulation sheet 131, the portion of the insulation sheets 133 and 134 having the length L3 and the insulation sheet 132 are not covered with the reinforcing sheets 135 and 136. Thus, the heat generated by the flow of the current through the conductor 12 is transmitted to the stator core 11 without going through the reinforcing sheets 135 and 136. That is, a high heat dissipation property is obtained at the central portion of the stator core 11 in the axial direction. Even though the reinforcing sheets 135 and 136 deteriorate under a high temperature environment, the contact area between the laminated insulation sheet 131 and the stator core 11 does not change, and the high heat dissipation property is also maintained.

CONCLUSION

According to the embodiment described above, the slot liner 13 includes the laminated insulation sheet 131 including the plurality of insulation sheets 132 to 134 being laminated and a pair of reinforcing sheets 135 and 136 for reinforcing the laminated insulation sheet 131. The laminated insulation sheet 131 includes the insulation sheet 134 that comes into contact with the inner surface 112d of the slot 112 and the insulation sheet 132 that comes into contact with the conductor 12. The length L1 of the laminated insulation sheet 131 is longer than the length L2 of the stator core 11 in the axial direction. The reinforcing sheet 135 is folded back in such a way as to cover the end surfaces 133a and 134a of the insulation sheets 133 and 134, and the reinforcing sheet 136 is folded back in such a way as to cover the end surfaces 133b and 134b of the insulation sheets 133 and 134. The reinforcing sheets 135 includes the first end portion 135f1 and the second half portion 135g, and the reinforcing sheets 136 includes the first end portion 136f1 and the second half portion 136g. The first end portions 135f1 and 136f1 are disposed between the inner surface 112d of the slot 112 and the insulation sheet 134. The second half portions 135g and 136g are disposed between the insulation sheet 132 and the insulation sheet 133. In other words, even though the laminated insulation sheet 131 includes the insulation sheet 133 as in the present embodiment, the second half portions 135 g and 136g are disposed between the insulation sheet 132 and the insulation sheet 134.

According to this configuration, the conductor 12 is not in contact with the reinforcing sheets 135 and 136 in the slot liner 13. As a result, even though the reinforcing sheets 135 and 136 deteriorate under a high temperature environment, the degradation of insulation between the stator core 11 and the conductor 12 via the deteriorated reinforcing sheets 135 and 136 does not occur. That is, the reinforced slot liner 13 is obtained without causing the degradation of insulation. Technical issues such as damage of the reinforcing sheets 135 and 136 and deterioration in the work efficiency to pass through the conductor 12 do not occur when the conductor 12 is passed through.

According to the embodiment described above, the laminated insulation sheet 131 includes the insulation sheet 133 disposed between the insulation sheet 132 and the insulation sheet 134. The second half portion 135g and 136g are disposed between the insulation sheet 132 and the insulation sheet 133. The folded portion 135e covers the end surfaces 133a and 134a of the insulation sheets 133 and 134, and the folded portion 136e covers the end surfaces 133b and 134b of the insulation sheets 133 and 134. According to this configuration, even when a load (bending stress) is applied to the end portion of the insulation sheet 133 via the insulation sheet 132 when the coil end is formed, the stress is dispersed by the reinforcing sheets 135 and 136. Thus, the damage of both end portions of the insulation sheet 133 that is mechanically fragile in the insulation sheets 132 to 134 does not occur. According to this configuration, since the end portions of the insulation sheet 133 are covered with the reinforcing sheets 135 and 136, the end portions of the insulation sheet 133 are sufficiently reinforced. That is, the reinforced slot liner 13 is obtained without causing degradation of insulation. According to this configuration, the degradation of insulation and the technical issues described above do not occur.

According to the embodiment described above, the insulation sheets 132 and 134 each include a reconstituted mica base sheet MS1 and a glass cloth sheet GS being laminated. The insulation sheet 133 includes a mica splittings base sheet MS2 and a glass cloth sheet GS being laminated. According to this configuration, when the laminated insulation sheet 131 is bent, the insulation sheets 132 and 134 support the insulation sheet 133, thereby preventing the concentration of the stress and preventing breakage of the insulation sheet 133. Workability is also improved when the slot liner 13 is disposed in the slot 112. That is, the reinforced slot liner 13 is obtained without causing the degradation of insulation.

According to the embodiment described above, the reinforcing sheets 135 and 136 are a sheet made of a polymer material such as polyimide. According to this configuration, the reinforcing sheets 135 and 136 have high heat resistance. Thus, the deterioration of the reinforcing sheets 135 and 136 hardly occurs under a high temperature environment. That is, the reinforced slot liner 13 is obtained without causing the degradation of insulation.

According to the embodiment described above, the rotating electric machine 1 includes the slot liner 13. According to this configuration, the degradation of insulation and the technical issues described above do not occur in the rotating electric machine 1. That is, the reinforced rotating electric machine 1 is obtained without causing the degradation of insulation.

OTHER EMBODIMENTS

Note that the rotating electric machine according to the present invention is not limited to a canned motor pump that transports a high-temperature liquid. That is, for example, the rotating electric machine according to the present invention may be a motor pump that transports a liquid, a driving motor such as an electric vehicle, or a generator.

The configuration of the laminated insulation sheet in the present invention is not limited to the configuration in the present embodiment. That is, for example, the laminated insulation sheet in the present invention need not include any one of the inner insulation sheet, the intermediate insulation sheet, or the outer insulation sheet. That is, for example, the laminated insulation sheet in the present invention may include a two-layered insulation sheet with the intermediate insulation sheet and the outer insulation sheet. For example, the laminated insulation sheet in the present invention may include four or more layered insulation sheets including a plurality of intermediate insulation sheets.

The intermediate insulation sheet in the present invention may include a plurality of insulation sheets (e.g., mica splittings insulation sheets) being laminated.

The size (the shape) of the insulation sheet in the present invention need not be the same. That is, for example, when viewed in the axial direction, the size of the insulation sheets in the present invention may be adjusted in such a way that the end portions of the insulation sheets on the wedge side are aligned. According to this configuration, the end portion of the inner insulation sheet on the wedge side does not project toward the wedge side, and a space in which the wedge is disposed is ensured.

The material forming the insulation sheet in the present invention is not limited to the mica splittings insulation sheet, the reconstituted mica insulation sheet, and the glass cloth sheet.

The slot liner according to the present invention may include a second reinforcing sheet that assists the first half portion. In this case, for example, the second reinforcing sheet may be formed in substantially the same size as the first half portion and disposed between the first half portion and the outer insulation sheet. For example, the first half portion designed to be longer in the long-side direction than the second half portion may be folded back, and thus the second reinforcing sheet may be formed. According to this configuration, the effect of dispersing the stress in forming the coil end is improved.

The size of the first end portion of the reinforcing sheet in the present invention may be such that the first end portion is disposed between the inner surface of the slot and the outer insulation sheet and is not limited to the size in the present embodiment.

The material of the reinforcing sheet in the present invention may be any material having heat resistance and an insulation property and is not limited to polyimide. That is, for example, the material of the reinforcing sheet in the present invention may be an insulation material that does not contain asbestos.

The second half portion of the reinforcing sheet in the present invention may be disposed between the outer insulation sheet and the intermediate insulation sheet.

Figure 8:
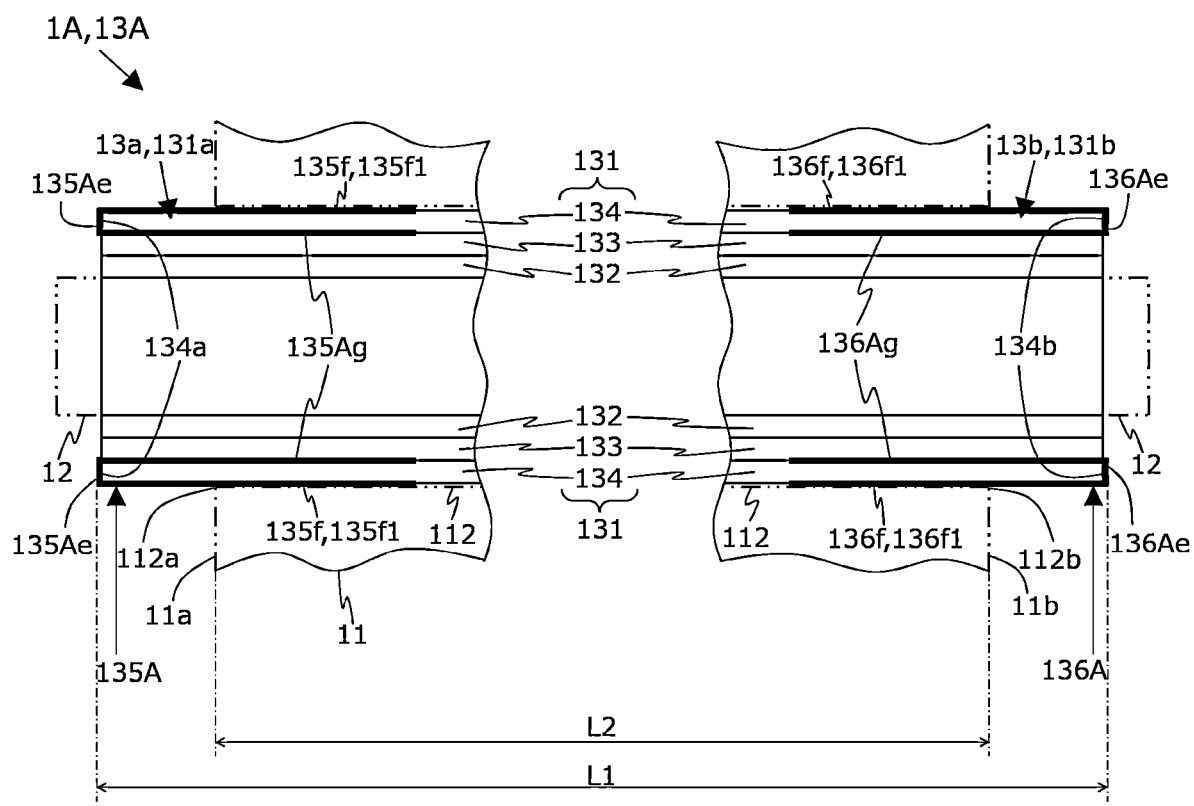
FIG. 8 is a schematic diagram illustrating a modification example of the slot liner according to the present invention.

FIG. 8 is a schematic diagram illustrating a modification example of the slot liner according to the present invention. The figure illustrates a part of a rotating electric machine 1A including the slot liner 13A in the modification example with the same viewpoint as in FIG. 5. FIG. 8 illustrates the thickness of each member intentionally emphasizing more than the actual dimensions thereof in order to clarify the positional relationship of each member forming the slot liner 13A.

The slot liner 13A includes the laminated insulation sheet 131 (132 to 134) and a pair of reinforcing sheets 135A and 136A. Folded portions 135Ae and 136Ae of the reinforcing sheets 135A and 136A cover the end surfaces 134a and 134b of the insulation sheet 134. Second half portions 135Ag and 136Ag of the reinforcing sheets 135A and 136A are disposed between the insulation sheet 133 (the intermediate insulation sheet) and the insulation sheet 134 (the outer insulation sheet). That is, the present modification example differs from the previously described embodiment in that only both end portions of the insulation sheet 134 out of the laminated insulation sheet 131 are sandwiched between the reinforcing sheets 135A and 136A. According to this configuration, similarly to the embodiment described above, even though the reinforcing sheets 135A and 136A deteriorate under a high temperature environment, the degradation of insulation between the stator core 11 and the conductor 12 via the deteriorated reinforcing sheets 135A and 136A does not occur. Technical issues such as damage of the reinforcing sheets 135A and 136A and deterioration in the work efficiency to pass through the conductor 12 do not occur when the conductor 12 is passed through.

ASPECTS OF THE PRESENT INVENTION

Next, aspects of the present invention conceived from the embodiments described above will be described below with reference to the terms and reference signs described in the embodiments.

A first aspect of the present invention is a slot liner (e.g., the slot liner 13) disposed in a slot (e.g., the slot 112) of a stator core (e.g., the stator core 11) included in a rotating electric machine (e.g., the rotating electric machines 1 and 1A) and configured to provide insulation between a conductor (e.g., the conductor 12) passed through inside the slot and the stator core, and the slot liner includes: a laminated insulation sheet (e.g., the laminated insulation sheet 131) including a plurality of insulation sheets (e.g., the insulation sheets 132 to 134) being laminated and having a length (e.g., the length L1) longer than a length (e.g., the length L2) of the stator core in an axial direction of a rotating shaft (e.g., the rotating shaft 30) included in the rotating electric machine; and a pair of reinforcing sheets (e.g., the reinforcing sheets 135 and 136) configured to reinforce the laminated insulation sheet, in which the laminated insulation sheet includes an outer insulation sheet (e.g., the insulation sheet 134) in contact with an inner surface (e.g., the inner surface 112*d*) of the slot and an inner insulation sheet (e.g., the insulation sheet 132) in contact with the conductor, and each of the pair of reinforcing sheets is folded back in the axial direction in such a way as to cover an end surface (e.g., the end surfaces 134*a* and 134*b*) of the outer insulation sheet and includes a folded portion (e.g., the folded portions 135*e*, 136*e*, 135Ae, and 136Ae) that covers the end surface of the outer insulation sheet, a first end portion (e.g., the first end portions 135*f*1 and 136*f*1) disposed between the inner surface of the slot and the outer insulation sheet, and a second end portion (e.g., the second half portions 135*g*, 136*g*, 135Ag, and 136Ag) disposed between the outer insulation sheet and the inner insulation sheet. According to this configuration, the degradation of insulation between the stator core 11 and the conductor 12 via the reinforcing sheets 135 and 136 does not occur. That is, the reinforced slot liner 13 is obtained without causing the degradation of insulation. Technical issues such as damage of the reinforcing sheets 135 and 136 and deterioration in the work efficiency to pass through the conductor 12 do not occur when the conductor 12 is passed through.

A second aspect of the present invention is the slot liner in the first aspect, in which the laminated insulation sheet includes an intermediate insulation sheet (e.g., the insulation sheet 133) disposed between the outer insulation sheet and the inner insulation sheet, the folded portion (e.g., the folded portions 135*e* and 136*e*) covers an end surface (e.g., the end surfaces 133*a* and 133*b*) of the intermediate insulation sheet in the axial direction, and the second end portion is disposed between the inner insulation sheet and the intermediate insulation sheet. According to this configuration, the damage of both end portions of the insulation sheet 133 that is mechanically fragile in the insulation sheets 132 to 134 does not occur. The degradation of insulation and the technical issues described above do not occur either.

A third aspect of the present invention is the slot liner (e.g., the slot liner 13A) in the first aspect, in which the laminated insulation sheet includes an intermediate insulation sheet (e.g., the insulation sheet 133) disposed between the outer insulation sheet and the inner insulation sheet, and the second end portion (e.g., the second half portions 135Ag and 136Ag) is disposed between the outer insulation sheet and the intermediate insulation sheet. According to this configuration, the degradation of insulation and the technical issues described above do not occur.

A fourth aspect of the present invention is the slot liner in the second or third aspect, in which each of the outer insulation sheet and the inner insulation sheet includes a base sheet (e.g., the reconstituted mica base sheet MS1) including reconstituted mica and a glass cloth sheet (e.g., the glass cloth sheet GS) woven with glass fibers being laminated, and the intermediate insulation sheet includes a base sheet (e.g., the mica splittings base sheet MS2) including mica splittings and a glass cloth sheet woven with the glass fibers being laminated. According to this configuration, when the laminated insulation sheet 131 is bent, breakage of the insulation sheet 133 is prevented. Workability is also improved when the slot liner 13 is disposed in the slot 112.

A fifth aspect of the present invention is the slot liner in any one of the first to fourth aspects, in which the reinforcing sheet is a sheet made of polyimide. According to this configuration, the deterioration of the reinforcing sheets 135 and 136 hardly occurs under a high temperature environment.

A sixth aspect of the present invention is a rotating electric machine (e.g., the rotating electric machines 1 and 1A) including the slot liner according to any one of the first to the fifth aspects. This configuration enables providing the rotating electric machine in which the degradation of insulation and the technical issues described above do not occur.

REFERENCE SIGNS LIST

1 Rotating electric machine
11 Stator core
112 Slot
112*d* Inner surface
12 Conductor
13 Slot liner
131 Laminated insulation sheet
132 Insulation sheet (Inner insulation sheet)
133 Insulation sheet (Intermediate insulation sheet)
133*a* End surface
133*b* End surface
134 Insulation sheet (Outer insulation sheet)
134*a* End surface
134*b* End surface
135 Reinforcing sheet
135*e* Folded portion
135*f*1 First end portion
135*g* Second half portion (Second end portion)
136 Reinforcing sheet
136*e* Folded portion
136*f*1 First end portion
136*g* Second half portion (Second end portion)
1A Rotating electric machine
13A Slot liner
135A Reinforcing sheet
135Ae Folded portion
135Ag Second half portion (Second end portion)
136A Reinforcing sheet
136Ae Folded portion
136Ag Second half portion (Second end portion)

The invention claimed is:

1. A slot liner disposed in a slot of a stator core included in a rotating electric machine and configured to provide insulation between a conductor passed through inside the slot and the stator core, the slot liner comprising:
a laminated insulation sheet including a plurality of insulation sheets being laminated and having a length longer than a length of the stator core in an axial direction of a rotating shaft included in the rotating electric machine; and
a pair of reinforcing sheets configured to reinforce the laminated insulation sheet, wherein
the laminated insulation sheet includes:
an outer insulation sheet in contact with an inner surface of the slot; and
an inner insulation sheet in contact with the conductor, and
each of the pair of reinforcing sheets is folded back in the axial direction in such a way as to cover an end surface of the outer insulation sheet and includes:
a folded portion that covers the end surface of the outer insulation sheet;
a first end portion disposed between the inner surface of the slot and the outer insulation sheet; and a second end portion disposed between the outer insulation sheet and the inner insulation sheet.

2. The slot liner according to claim 1, wherein
the laminated insulation sheet includes an intermediate insulation sheet disposed between the outer insulation sheet and the inner insulation sheet,
the folded portion covers an end surface of the intermediate insulation sheet in the axial direction, and
the second end portion is disposed between the inner insulation sheet and the intermediate insulation sheet.

3. The slot liner according to claim 2, wherein
each of the outer insulation sheet and the inner insulation sheet includes a base sheet including reconstituted mica and a glass cloth sheet woven with glass fibers being laminated, and
the intermediate insulation sheet includes a base sheet including mica splittings and a glass cloth sheet woven with the glass fibers being laminated.

4. The slot liner according to claim 1, wherein
the laminated insulation sheet includes an intermediate insulation sheet disposed between the outer insulation sheet and the inner insulation sheet, and
the second end portion is disposed between the outer insulation sheet and the intermediate insulation sheet.

5. The slot liner according to claim 4, wherein
each of the outer insulation sheet and the inner insulation sheet includes a base sheet including reconstituted mica and a glass cloth sheet woven with glass fibers being laminated, and
the intermediate insulation sheet includes a base sheet including mica splittings and a glass cloth sheet woven with the glass fibers being laminated.

6. The slot liner according to claim 1, wherein the reinforcing sheet is a sheet made of polyimide.

7. A rotating electric machine comprising the slot liner according to claim 1.

* * * * *